US008549507B2

(12) United States Patent
Kim et al.

(10) Patent No.: US 8,549,507 B2
(45) Date of Patent: Oct. 1, 2013

(54) LOOP COALESCING METHOD AND LOOP COALESCING DEVICE

(75) Inventors: Hee Seok Kim, Seoul (KR); Hong-Seok Kim, Seongnam-si (KR); Chang-Woo Baek, Hwaseong-si (KR); Jeongwook Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1105 days.

(21) Appl. No.: 11/843,357

(22) Filed: Aug. 22, 2007

(65) Prior Publication Data

US 2008/0235657 A1  Sep. 25, 2008

(30) Foreign Application Priority Data

Mar. 23, 2007  (KR) .................. 10-2007-0028856

(51) Int. Cl.
*G06F 9/45* (2006.01)
(52) U.S. Cl.
USPC .......................... 717/160; 717/159; 717/161
(58) Field of Classification Search
None
See application file for complete search history.

(56) References Cited

U.S. PATENT DOCUMENTS

| 5,361,354 | A | * | 11/1994 | Greyzck ..................... 717/160 |
| 5,634,046 | A | * | 5/1997 | Chatterjee et al. ........... 712/227 |
| 5,822,593 | A | * | 10/1998 | Lamping et al. ............. 717/161 |
| 5,848,285 | A | * | 12/1998 | Kapusta et al. ............... 712/1 |
| 5,958,048 | A | * | 9/1999 | Babaian et al. .............. 712/241 |
| 6,041,181 | A | * | 3/2000 | Ju et al. ...................... 717/114 |
| 6,052,776 | A | * | 4/2000 | Miki et al. ................... 712/233 |
| 6,070,011 | A |   | 5/2000 | Liu et al. |
| 6,145,076 | A | * | 11/2000 | Gabzdyl et al. ............. 712/241 |
| 6,243,734 | B1 | * | 6/2001 | Doshi et al. ................. 708/607 |
| 6,301,706 | B1 | * | 10/2001 | Maslennikov et al. ....... 717/160 |
| 6,651,246 | B1 | * | 11/2003 | Archambault et al. ....... 717/160 |
| 6,754,893 | B2 | * | 6/2004 | Granston et al. ............. 717/161 |
| 6,820,250 | B2 | * | 11/2004 | Muthukumar et al. ....... 717/116 |
| 7,086,047 | B1 | * | 8/2006 | Edwards et al. .............. 717/160 |
| 7,210,024 | B2 | * | 4/2007 | McIlvaine et al. ........... 712/208 |
| 7,249,248 | B2 | * | 7/2007 | Vinnakota et al. ........... 712/241 |
| 7,302,557 | B1 | * | 11/2007 | Hwu et al. ................... 712/241 |
| 7,302,680 | B2 | * | 11/2007 | Collard et al. ............... 717/160 |

(Continued)

FOREIGN PATENT DOCUMENTS

| JP | 06-004300 A | 1/1994 |
| JP | 08-115220 A | 5/1996 |

(Continued)

OTHER PUBLICATIONS

James C. Dehnert, et al., "Overlapped Loop Support in the Cydra5", 1989, ACM, pp. 26-38.*

(Continued)

*Primary Examiner* — Thuy Dao
*Assistant Examiner* — Xi D Chen
(74) *Attorney, Agent, or Firm* — Sughrue Mion, PLLC

(57) ABSTRACT

A loop coalescing method and a loop coalescing device are disclosed. The loop coalescing method comprises removing an inner-most loop from among nested loops, so that an outer operation provided outside of the inner-most loop is performed when a condition of a conditional statement is satisfied, generating a guard code by applying an if-conversion method to the conditional statement, and converting a guard by using an instruction calculating the guard of the guard code, the instruction calculating the guard using a register where information related to a period of time corresponding to the number of iterations of the inner-most loop is stored.

11 Claims, 7 Drawing Sheets

(56) References Cited

U.S. PATENT DOCUMENTS

| | | | |
|---|---|---|---|
| 7,689,980 B2* | 3/2010 | Du et al. | 717/160 |
| 7,757,222 B2* | 7/2010 | Liao et al. | 717/160 |
| 8,104,028 B2* | 1/2012 | Stoodley et al. | 717/159 |
| 8,136,102 B2* | 3/2012 | Papakipos et al. | 717/161 |
| 8,136,104 B2* | 3/2012 | Papakipos et al. | 717/159 |
| 8,146,066 B2* | 3/2012 | Demetriou et al. | 717/161 |
| 8,225,295 B2* | 7/2012 | Palsberg et al. | 717/159 |
| 8,234,636 B2* | 7/2012 | Kawahito et al. | 717/159 |
| 8,443,349 B2* | 5/2013 | Papakipos et al. | 717/159 |
| 8,448,156 B2* | 5/2013 | Demetriou et al. | 717/161 |
| 2002/0144092 A1* | 10/2002 | Topham et al. | 712/217 |
| 2005/0081017 A1* | 4/2005 | Rupley et al. | 712/208 |

FOREIGN PATENT DOCUMENTS

| | | |
|---|---|---|
| JP | 11-212799 A | 8/1999 |
| JP | 11-242598 A | 9/1999 |
| JP | 2005-222262 A | 8/2005 |

OTHER PUBLICATIONS

David F. Bacon, et al., "Compiler Transformations for High-Performance Computing", 1994, ACM Computing Surveys, vol. 26, No. 4, pp. 235-420.*

Monica Lam "Software Pipelining: An Effective Scheduling Technique for VLIW Machines", 1988, ACM, pp. 318-328.*

B.R. Rau, et al "Code Generation Schemas for Modulo Scheduled DO-Loops and WHILE-Loops", 1992, Hewlett-Packard Company, pp. 1-35.*

Chamski, "Enumeration of Dense Non-Convex Iteration Sets", 1995 IEEE; [retrieved on May 22, 2013]; Retrieved from Internet <URL:http://ieeexplore.ieee.org/stamp/stamp.jsp?tp=&arnumber=389144>;pp. 156-163.*

Wang, et al., "Reconstructing Control Flow in Modulo Scheduled Loops", 2008 IEEE; [retrieved on May 22, 2013]; Retrieved from Internet <URL:http://ieeexplore.ieee.org/stamp/stamp.jsp?tp=&arnumber=4529874>;pp. 539-544.*

Kandemir, "A Global Communication Optimization Technique Based on Data-Flow Analysis and Linear Algebra", 2000 ACM; [retrieved on May 22, 2013]; Retrieved from Internet <URL:http://dl.acm.org/citation.cfm?id=330643>;pp. 1251-1297.*

Song, "Data Locality Enhancement by Memory Reduction", 2001 ACM; [retrieved on May 22, 2013]; Retrieved from Internet <URL:http://dl.acm.org/citation.cfm?id=377792>;pp. 50-64.*

* cited by examiner

LOOP COALESCING METHOD AND LOOP COALESCING DEVICE

CROSS-REFERENCE TO RELATED APPLICATION

This application claims priority from Korean Patent Application No. 10-2007-0028856, filed on Mar. 23, 2007, in the Korean Intellectual Property Office, the entire disclosure of which is incorporated herein by reference.

BACKGROUND OF THE INVENTION

1. Field of the Invention

Methods and apparatuses consistent with the present invention relate to a loop coalescing device, and more particularly, to loop coalescing of nested loops.

2. Description of the Related Art

An ultimate objective of processor developers is to operate processors at relatively higher speeds. To this purpose, processor developers have focused their studies on technologies for enabling processors to perform a plurality of instructions in parallel.

Of these technologies, a software pipeline technology which enables a processor to perform a plurality of instructions in parallel has been proposed. In the software pipeline technology, performance of instructions is partially divided into several steps, which are called stages. Each instruction is sequentially processed through the respective stages. Since each instruction is performed in parallel in the stage having a number of instruction operations, processing speed of the instruction is increased.

However, in order to effectively utilize the software pipeline technology, it is required that a program including nested loops is coalesced into an inner-most loop.

Further, in the software pipeline technology, the processing speed of the instructions may be limited. Specifically, one of the main reasons for a reduction of the processing speed of the instructions is a change in the flow of a program, dependency of data, and the like.

The change in the flow of the program may be caused by a conditional statement. As the number of branches of conditional statements increases, the processing speed of the instructions is reduced. Accordingly, there is a great need for reducing the number of branches of the conditional statements.

Also, there are many cases where a complex operation is required to determine conditions for the conditional statements. Particularly, when the condition has an operation such as modulo, an overhead of the processor is increased.

Therefore, there is a great need for an effective loop coalescing method and a loop coalescing device which can replace a condition for a conditional statement with a simple operation.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides a loop coalescing method and a loop coalescing device in which nested loops are effectively coalesced.

Another aspect of the present invention provides a loop coalescing method and a loop coalescing device in which a branch of a conditional statement is effectively removed to prevent a flow of a program from being changed.

Still another aspect of the present invention provides a loop coalescing method and a loop coalescing device in which a guard, which is periodically set, is calculated by using a new instruction, and thus, the guard is calculated merely by using a simple operation.

Yet another aspect of the present invention provides a loop coalescing method and a loop coalescing device in which a loop operation is effectively performed by recycling processor resources.

According to an aspect of the present invention, there is provided a loop coalescing method comprising removing an inner-most loop from among nested loops, so that an outer operation provided outside of the inner-most loop is performed when a condition of a conditional statement is satisfied, generating a guard code by applying an if-conversion method to the conditional statement, and converting a guard by using an instruction calculating the guard of the guard code, the instruction calculating the guard using a register where information related to a period of time corresponding to the number of iterations of the inner-most loop is stored.

The instruction either outputs a specific bit of a register where information related to the period of time is stored as is, or calculates the guard by comparing a value of the register with a value of a counter.

The converting of the guard stores, in the register, the period of time as is, and calculates the guard by comparing a value of a counter with a value of the register, the value of the counter being incremented by one each time the instruction is called.

In this instance, the converting of the guard stores a first level value only in an address corresponding to the period of time of the register, and calculates the guard by incrementing a read address of the register each time the instruction is called.

The loop coalescing method further comprises performing the outer operation provided outside of the inner-most loop depending on logical values of the converted guard.

According to another aspect of the present invention, there is provided a loop coalescing device comprising a loop removal unit for removing an inner-most loop from among nested loops, so that an outer operation provided outside of the inner-most loop is performed when a condition of a conditional statement is satisfied, a guard code generation unit for generating a guard code by applying an if-conversion method to the conditional statement, and a guard conversion unit for converting a guard by using an instruction calculating the guard of the guard code, the instruction calculating the guard using a register where information related to a period of time corresponding to the number of iterations of the inner-most loop is stored.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Reference will now be made in detail to exemplary embodiments of the present invention, examples of which are illustrated in the accompanying drawings, wherein like program segments refer to the like elements throughout. The exemplary embodiments are described below in order to explain the present invention by referring to the figures.

Figure 1:
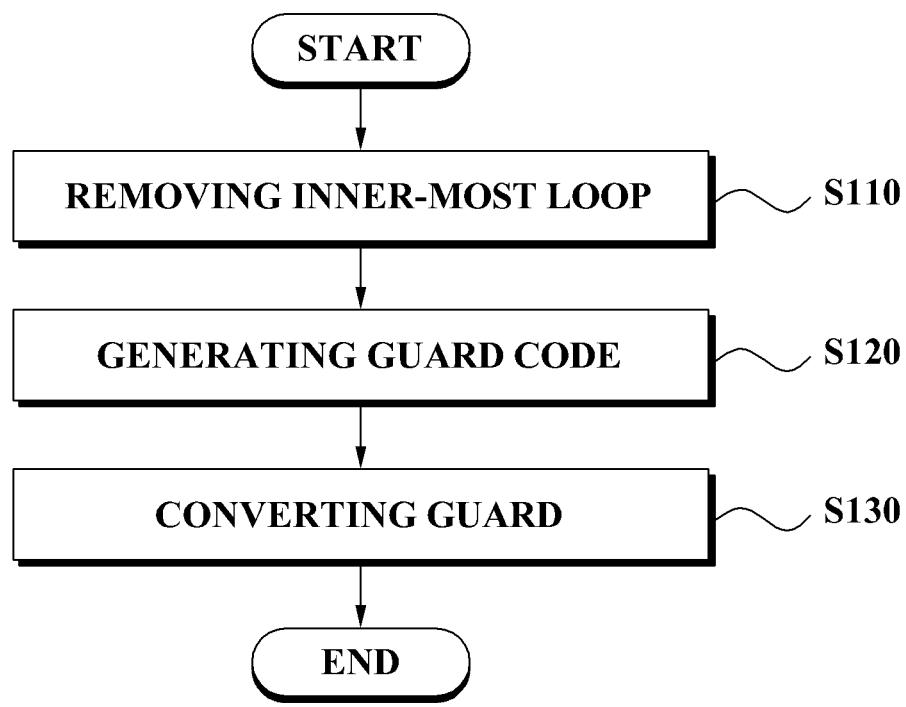
FIG. 1 is a flowchart illustrating a loop coalescing method according to an exemplary embodiment of the present invention.

FIG. 1 is a flowchart illustrating a loop coalescing method according to an exemplary embodiment of the present invention.

Referring to FIG. 1, in operation S110, a loop coalescing method according to an exemplary embodiment of the present invention removes an inner-most loop from among nested loops so that an outer operation provided outside of the inner-most loop is performed when conditions of a conditional statement are satisfied.

However, even a program having the inner-most loop removed must finally return the same result value as that in the program before the inner-most loop was removed.

In this instance, the nested loops may be a dual-loop. However, even nested loops deeper than the dual-loop may repeat operation S110 for removing the inner-most loop.

Also, in operation S120, the loop coalescing method according to an exemplary embodiment of the present invention generates a guard code by applying an if-conversion method to the conditional statement.

A conditional statement having a plurality of branches may be converted to have a single branch through the if-conversion method, and thus, processing speed of a program is significantly increased when an instruction is performed using a software pipeline technology.

The guard code includes instructions and guards for determining whether instructions are performed.

In addition, in operation S130, the loop coalescing method according to an exemplary embodiment of the present invention converts a guard by using an instruction calculating guards of the guard code. The instruction calculates the guard using a register where information related to a period of time corresponding to the number of iterations of the inner-most loop is stored.

The instruction either outputs a specific bit of a register where information related to the period of time is stored as it is, or calculates the guard by comparing a value of the register with a value of a counter.

In operation S130 for converting the guard, the period of time is stored in the register as is, and the guard is calculated by comparing a value of a counter with a value of the register. Here, the value of the counter is incremented by one each time the instruction is called.

Also, in operation S130, a first level value is stored only in an address corresponding to the period of time of the register, and the guard is calculated by incrementing a read address of the register each time the instruction is called.

The loop coalescing method according to an exemplary embodiment of the present invention may further comprise performing the outer operation provided outside of the inner-most loop depending on logical values of the converted guard.

Each operation in FIG. 1 may be performed either sequentially as illustrated, or in reverse order.

Figure 2:
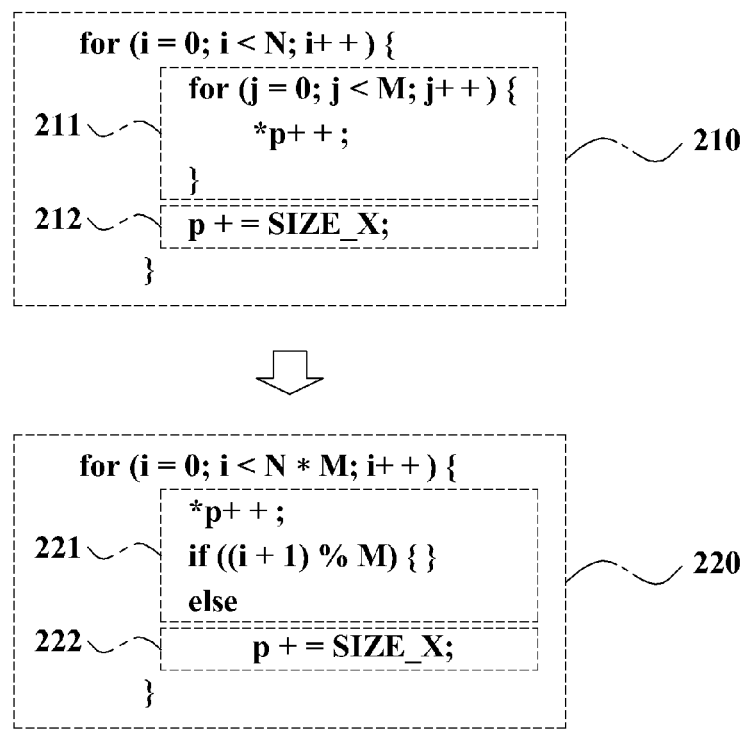
FIG. 2 illustrates an example of a source code of a program before and after removing an inner most loop according to an exemplary embodiment of the present invention.

FIG. 2 illustrates an example of a source code of a program before and after removing an inner most loop according to an exemplary embodiment of the present invention.

Referring to FIG. 2, a program segment 210 denotes a program source code including a dual-loop. The inner-most loop 211 repeatedly performs an operation of *p++ M times. Then, the outer operation 212 provided outside of the inner-most loop 211, that is, p+=SIZE_X, is performed.

An outer loop provided outside of the inner-most loop is repeated N times. Thus, the number of iterations of the inner-most loop 211 is M and the number of iterations of the outer loop is N, and accordingly, the total number of iterations where a loop is repeated is N×M times.

Also, the outer operation 212 of the inner-most loop 211 is performed once each time the inner-most loop 211 is repeated M times, and accordingly, is performed N times in terms of the total number.

The outer operation 212 provided outside of the inner-most loop 211 from among the dual-loop is performed when a condition of a conditional statement is satisfied, thereby enabling the inner-most loop 211 to be removed.

Another program segment 220 as illustrated in FIG. 2 denotes a program source code in which the inner-most loop 211 has been removed by performing the outer loop 212 of the inner-most loop 211 from among the dual-loop illustrated in the program segment 210 when the condition of the conditional statement is satisfied.

The other program segment 220 finally returns the same operation result value as that in the program of the other program segment 210.

The other program segment 220 is obtained by removing the inner-most loop 211 from the program source code of the program segment 210. Specifically, in the other program segment 220, a conditional statement 221 is additionally provided and the inner-most loop 211 having been provided in the program segment 210 is removed. Also, there is no difference between the outer operations 212 and 222.

As for an operation of the program source code as illustrated in the other program segment 220, a loop is repeated N×M times, and accordingly, is performed N×M times in terms of the total number.

Additionally, an operation of the program segment 222 is the same as that of the program segment 212, which is performed once each time the loop is repeated M times, and accordingly, performed N times in terms of the total number.

This is because, since % denotes the remaining operators in the conditional statement included in the program segment 221, an operation of the program segment 222 is only performed when the condition of the conditional statement, that is '(i+1) % M' returns 'false'.

Accordingly, the program segment 220 finally returns the same result as that in the program of the program segment 210.

Consequently, in a program including nested loops, an outer operation provided outside of an inner-most loop from among nested loops is performed when a condition of a conditional statement is satisfied, thereby removing the inner-most loop.

It is noted that '(i+1) % M' as illustrated in the program segment 221 returns 'false' each time the loop is repeated M times, so that the operation of the program segment 222 is performed. That is, a condition of the conditional statement is periodically changed to either 'true' or 'false'. Additionally, since the condition is periodically changed, the operation of the program segment 222 is performed at a predetermined interval.

Since an operation of '%' (modulo) is complex and has a large overhead, the operation needs to be converted into a relatively simple operation or code.

Detailed explanations with respect to a configuration for converting a guard of a guard code will be given in detail later using the fact that the condition provided in the program segment 221 is periodically changed either into false or true.

Finally, the program segments 210 and 220 as illustrated in FIG. 2 return an identical operation result to each other, respectively, however, the program segment 220 is obtained by removing the inner-most loop 211 including the dual-loop.

Figure 3:
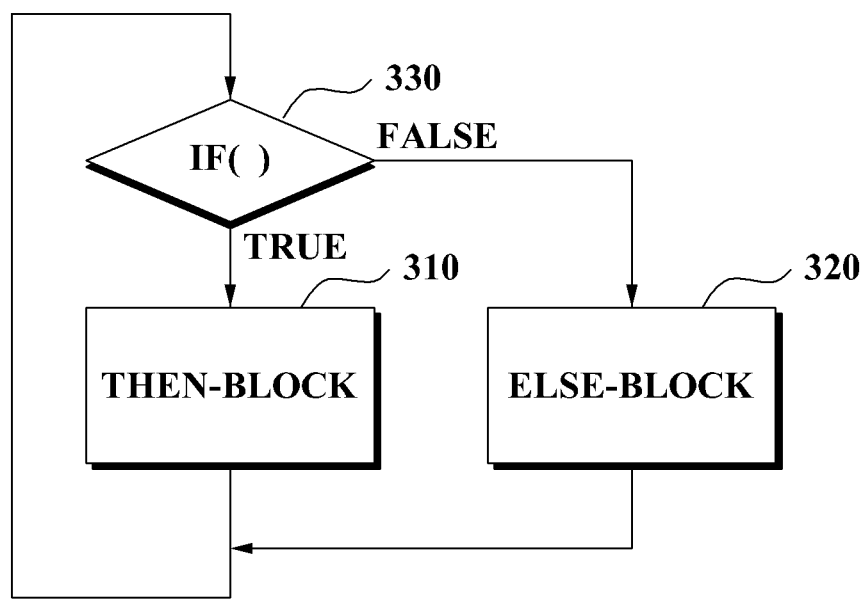
FIG. 3 is a flowchart illustrating a program before if-conversion.

FIG. 3 is a flowchart illustrating a program before if-conversion.

Referring to FIG. 3, there are two instruction blocks 310 and 320.

When a condition of a conditional statement 330 is true, an instruction block of a then-block 310 is performed. Conversely, when a condition of a conditional statement 330 is false, an instruction block of an else-block 320 is performed. Additionally, a loop in which any one of the instruction blocks is performed depending on conditions of the conditional statement 330 is repeated.

Therefore, there exist two branches depending on conditions of the conditional statement 330.

When a plurality of branches exist while each instruction is being processed in parallel using a software pipeline technology, a delay in the processing speed of a processor occurs. That is, existence of the plurality of branches is a main cause of a delay in the processing speed of a processor. Therefore, it is required to convert the plurality of branches into one data flow. For this reason, an if-conversion method is required to convert the plurality of branches.

The if-conversion method is used for converting to enable one instruction block to be performed using a guard code when instruction blocks performed depending on conditions a conditional statement are different from one another.

Figure 4:
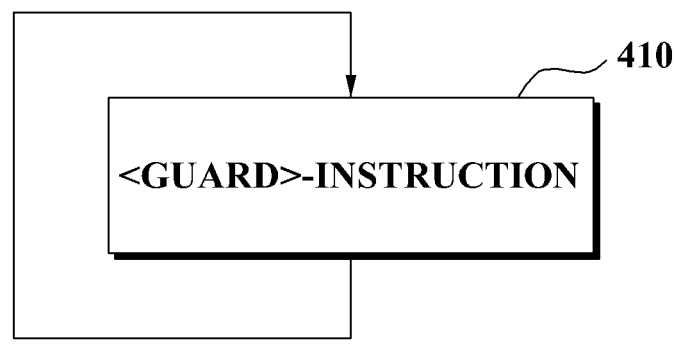
FIG. 4 is a flowchart illustrating a program after if-conversion according to an exemplary embodiment of the present invention.

FIG. 4 is a flowchart illustrating a program after if-conversion according to an exemplary embodiment of the present invention.

Referring to FIG. 4, there exists only one instruction block 410 after predetermined branches have been removed. When the if-conversion method is applied to the conditional statement, a guard code is generated. The guard code may include guards and instructions.

For example, when the guard code is expressed by '<q>A', <q> denotes a guard and A denotes an instruction. In this instance, the guard code, that is, '<q>A' performs the instruction of A only when 'q' is true. Conversely, when 'q' is false, the instruction of A is not performed. Specifically, through the if-conversion method, whether the guard is either true or false is determined before performing an instruction, and then the instruction is performed only when the guard is true.

Again, referring to the program segment 220 of FIG. 2, the program source code of the program segment 220 is converted through the if-conversion method as follows.

```
for (i = 0; i < N * M: i++) {
    *p++;
    if (NEW_INSTRUCTION)
        p += SIZE_X;
}
```

Specifically, in the program segment 220, since an if-else statement performs different instructions in response to the respective cases where a condition is either true or false, the if-else statement has two branches.

The program source code illustrated in the program segment 220 is converted into an if statement through the if-conversion method, and a guard code including a guard of 'if(NEW-INSTRUCTION)' and an instruction of 'p+=SIZE_X' is generated. Specifically, performance of the instruction of 'p+=SIZE_X' is determined depending on logical values of the guard.

Thus, a program having at least two branches may be converted into a program having one data flow through the if-conversion method.

The calculation of the guard will now be described according to an exemplary embodiment of the present invention.

The loop coalescing method according to the present exemplary embodiment of the invention converts the guard using an instruction calculating the guard of the guard code. Here, the instruction calculates the guard using a register where information related to a period of time corresponding to the number of iterations of the inner-most loop is stored.

That is, a new instruction calculating a guard of a guard code is defined, and then the new instruction converts the guard using the register.

Further, the instruction either outputs a specific bit of a register where information related to the period of time is stored as is, or calculates the guard by comparing a value of the register with a value of a counter.

Again, referring to FIG. 2, in the program segment 210 of FIG. 2, the number of iterations of the inner-most loop 211 is M. For example, when M=4 is given, information related to the period of time corresponding to the number of iterations (M=4) of the inner-most loop 211 is stored in a register, and the guard is converted by an instruction calculating a guard of a guard code by using the register.

Figure 5:
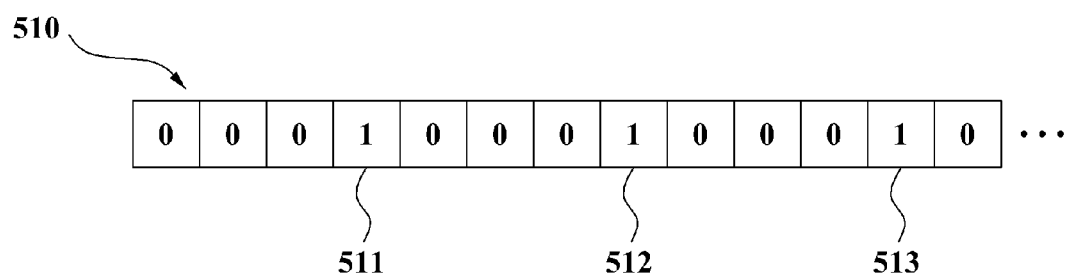
FIG. 5 is a block diagram illustrating a register calculating a guard according to an exemplary embodiment of the present invention.

FIG. 5 is a block diagram illustrating a register calculating a guard according to an exemplary embodiment of the present invention.

Referring to FIG. 5, information related to the period of time corresponding to the number (M=4) of iterations of the inner-most loop is stored in a register 510.

A first level value is stored only in cells 511, 512, and 513 of the register 510 corresponding to the period of time, and a read address of the register 510 is increased each time an instruction is called, thereby calculating a guard.

Specifically, since the information related to the period of time is set as '4', the first level value, that is, '1 (high)' is stored only in cells 511, 512 and 513 of the register 510 corresponding to the period of time.

In addition, the read address of the register 510 is increased each time the instruction is called. In this case, since M=4 is given, the first level value, that is, '1' is calculated as a guard each time the instruction is called four times.

The register of FIG. 5 is merely an exemplary embodiment of the present invention, and other exemplary embodiments of the present invention are not limited in respects above.

For example, when M=4 is given, cells 512 and 513 may not be used.

That is, referring to FIG. 5, the period of time corresponding to the number of iterations of the inner-most loop is set as '4'. The first level value, that is, '1' may be stored only in a cell 511 corresponding to the period of time. In this case, cells 512 and 513 where '1' is stored, respectively, as illustrated in FIG. 5 are not used.

'1' is stored only in a cell 511, and the read address of the register 510 is increased each time an instruction is called, thereby calculating a guard. When the read address of the register 510 is initialized, the first level value stored in the register 511 is calculated as a guard each time the instruction is called four times.

After the first level value stored in the register address 511 is calculated as a guard, the read address of the register 510 is initialized. Then, the read address of the register 510 is increased each time the instruction is called, so that the first level value stored in cell 511 is calculated as a guard each time the instruction is called a total of eight times.

Also, the read address of the register is increased each time the instruction is called, however, it is possible for the read address of the register to be reduced each time the instruction is called. In addition, intervals of read addresses of the register which is skipped each time the instruction is called may be variously set.

It is noted that the register and values stored in the register as illustrated in FIG. 5 are presented merely as an example for periodically calculating a first level value as a guard, in an ultimate manner, and are readily varied.

Furthermore, the loop coalescing method according to the exemplary embodiment of the present invention stores, in the register, a period of time corresponding to the number of iterations of the inner-most loop as it is, and calculates by comparing a count value, which is increased by one, with the register value each time an instruction is called.

Figure 6:
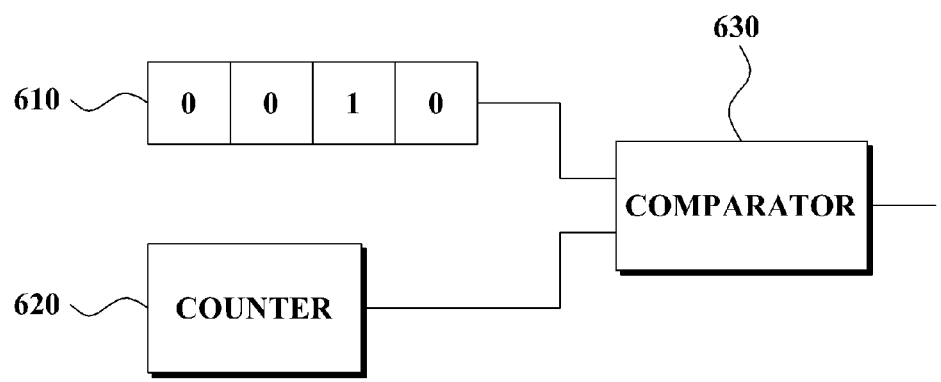
FIG. 6 is a block diagram illustrating a register and counter for calculating a guard according to an exemplary embodiment of the present invention.

FIG. 6 is a block diagram illustrating a register 610 and counter 620 for calculating a guard according to an exemplary embodiment of the present invention.

Referring to FIG. 6, a period of time corresponding to the number of iterations of the inner-most loop is stored in the register 610. Also, a counter value, which is increased by one each time an instruction is called, is compared with the register 610 via a comparator 630, thereby calculating a guard.

For example, when M=4 is given, the number of iterations of the inner-most loop is '4', and thus, '4' is stored in the register 610, that is, '0010' is stored.

The counter 620 is initialized as '0000', and increased by one each time an instruction is called. Each time the instruction is called four times, the counter outputs '0010', and accordingly, '1' is outputted via the comparator 630. Accordingly, each time the instruction is called four times, a guard has a logic value as true. Also, each time the instruction is called eight, twelve, and sixteen times, the guard has a logic value as true.

The exemplary embodiments of the present invention include computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like; and a computer data signal comprising a compression source code segment and an encryption source code segment. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Further, a program in which an inner-most loop from among nested loops is removed so that an outer operation provided outside of the inner-most loop is performed when a condition of a conditional statement is satisfied, and in which a guard code is generated by applying an if-conversion method to the conditional statement, wherein a guard of the guard code is calculated by using a register, where information related to a period of time corresponding to the number of iterations of the inner-most loop is stored, may be stored in a computer-readable recording media including program instructions to implement various operations embodied by a computer.

Figure 7:
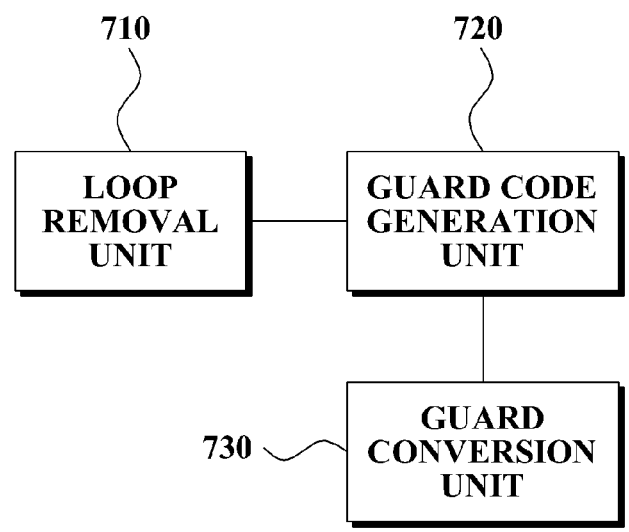
FIG. 7 is a block diagram illustrating a loop coalescing device.

FIG. 7 is a block diagram illustrating a loop coalescing device.

Referring to FIG. 7, a loop coalescing device according to the exemplary embodiment of the present invention comprising a loop removal unit 710 for removing an inner-most loop from among nested loops, so that an outer operation provided outside of the inner-most loop is performed when a condition of a conditional statement is satisfied, a guard code generation unit 720 for generating a guard code by applying an if-conversion method to the conditional statement, and a guard conversion unit 730 for converting a guard by using an instruction calculating the guard of the guard code, the instruction calculating the guard code using a register where information related to a period of time corresponding to the number of iterations of the inner-most loop is stored.

The instruction may either output a specific bit of a resister where information related to the period of time is stored as is, or calculate the guard by comparing a value of the register with a value of a counter.

The guard conversion unit may store, in the register, the period of time as is, and calculate the guard by comparing a value of a counter with a value of the register. In this instance the value of the counter is incremented by one each time the instruction is called.

Also, the guard conversion unit may store a first level value only in an address corresponding to the period of time of the register, and calculate the guard by incrementing a read address of the register each time the instruction is called.

In addition, the loop coalescing device according to the exemplary embodiment of the present invention may further comprise an operation performing unit for performing the outer operation provided outside of the inner-most loop depending on logical values of the converted guard.

Further, the loop coalescing device according to the exemplary embodiment of the present invention may be applied to a dual-loop.

As described above, the loop coalescing method and the loop coalescing device may effectively coalesce nested loops, and may effectively remove a branch of a conditional statement to prevent a flow of a program from being changed.

The loop coalescing method and the loop coalescing device may calculate a guard, which is periodically set, by using a new instruction, and thus, calculate the guard merely by using a simple operation.

The loop coalescing method and the loop coalescing device may effectively perform a loop operation by recycling processor resources.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A loop coalescing method executed by a processor, the method, comprising:
    removing an inner-most loop from among nested loops in a program, so that an outer operation provided outside of the inner-most loop is performed if a condition of a conditional statement is satisfied;
    providing the conditional statement in the program from which the inner-most loop has been removed, the condition of the conditional statement being periodically changed according to a number of iterations of the inner-most loop;
    generating a guard code by applying an if-conversion method to the conditional statement; and
    converting a guard of the guard code by using an instruction calculating the guard of the guard code, the instruction calculating the guard using a register where information related to a period of time corresponding to the number of iterations of the inner-most loop is stored,
    wherein the converting of the guard stores, in the register, the period of time corresponding to the number of iterations of the inner-most loop as is, and calculates the guard by comparing a value of a counter with a value of the register where the information related to the period of time corresponding to the number of iterations of the inner-most loop is stored, the value of the counter being incremented by one each time the instruction is called.

2. The method of claim 1, wherein the instruction calculating the guard either outputs a specific bit of the register where the information related to the period of time is stored as is, or calculates the guard by comparing a value of the register where the information related to the period of time corresponding to the number of iterations of the inner-most loop is stored with the value of a counter.

3. The method of claim 1, further comprising performing the outer operation provided outside of the inner-most loop depending on logical values of the converted guard.

4. The method of claim 1, wherein the nested loops are a dual-loop.

5. A loop coalescing method executed by a processor, the method comprising:
    removing an inner-most loop from among nested loops in a program, so that an outer operation provided outside of the inner-most loop is performed if a condition of a conditional statement is satisfied;
    providing the conditional statement in the program from which the inner-most loop has been removed, the condition of the conditional statement being periodically changed according to a number of iterations of the inner-most loop;
    generating a guard code by applying an if-conversion method to the conditional statement; and
    converting a guard of the guard code by using an instruction calculating the guard of the guard code, the instruction calculating the guard using a register where information related to a period of time corresponding to the number of iterations of the inner-most loop is stored,
    wherein the converting of the guard stores a first level value only in an address corresponding to the period of time corresponding to the number of iterations of the inner-most loop of the register, and calculates the guard by incrementing a read address of the register where the information related to a period of time corresponding to the number of iterations of the inner-most loop is stored, each time the instruction is called.

6. A non-transitory computer-readable recording medium having embodied thereon a computer program for executing a loop coalescing method, the method comprising:
    removing an inner-most loop from among nested loops in a program, so that an outer operation provided outside of the inner-most loop is performed if conditions of a conditional statement are satisfied;
    providing the conditional statement in the program from which the inner-most loop has been removed, the condition of the conditional statement being periodically changed according to a number of iterations of the inner-most loop;
    generating a guard code by applying an if-conversion method to the conditional statement; and
    converting a guard of the guard code by using an instruction calculating the guard of the guard code by using a register where information related to a period of time corresponding to the number of iterations of the inner-most loop is stored,
    wherein the instruction either outputs a specific bit of the register where information related to the period of time corresponding to the number of iterations of the inner-most loop is stored as is, or calculates the guard by comparing a value of the register where the information related to the period of time corresponding to the number of iterations of the inner-most loop is stored with a value of a counter.

7. A loop coalescing device comprising:
    a processor;
    a loop removal unit which removes an inner-most loop from among nested loops in a program, so that an outer operation provided outside of the inner-most loop is performed if a condition of a conditional statement is satisfied;
    a guard code generation unit which generates a guard code by applying an if-conversion method to the conditional statement; and
    a guard conversion unit which converts a guard of the guard code by using an instruction calculating the guard of the guard code, the instruction calculating the guard using a register where information related to a period of time corresponding to a number of iterations of the inner-most loop is stored,
    wherein the guard conversion unit stores, in the register, the period of time corresponding to the number of iterations of the inner-most loop as is, and calculates the guard by comparing a value of a counter with a value of the register where the information related to the period of time corresponding to the number of iterations of the inner-most loop is stored, the value of the counter being incremented by one each time the instruction is called,
    wherein the conditional statement is provided in the program from which the inner-most loop has been removed, and the condition of the conditional statement is periodically changed according to a number of iterations of the inner-most loop.

8. The device of claim 7, wherein the instruction calculating the guard of the guard code either outputs a specific bit of the resister where the information related to the period of time is stored as is, or calculates the guard by comparing a value of the register where the information related to the period of time corresponding to the number of iterations of the inner-most loop is stored with the value of a counter.

9. The device of claim 7, further comprising an operation performing unit which performs the outer operation provided outside of the inner-most loop depending on logical values of the converted guard.

10. The device of claim 9, wherein the nested loops are dual-loop.

11. A loop coalescing device comprising:
a processor;
a loop removal unit which removes an inner-most loop from among nested loops in a program, so that an outer operation provided outside of the inner-most loop is performed if a condition of a conditional statement is satisfied;
a guard code generation unit which generates a guard code by applying an if-conversion method to the conditional statement; and
a guard conversion unit which converts a guard of the guard code by using an instruction calculating a guard of the guard code, the instruction calculating the guard using a register where information related to a period of time corresponding to a number of iterations of the inner-most loop is stored,
wherein the guard conversion unit stores a first level value only in an address corresponding to the period of time corresponding to the number of iterations of the inner-most loop of the register, and calculates the guard by incrementing a read address of the register where the information related to the period of time corresponding to the number of iterations of the inner-most loop is stored, each time the instruction is called,
wherein the conditional statement is provided in the program from which the inner-most loop has been removed, and the condition of the conditional statement is periodically changed according to a number of iterations of the inner-most loop.

* * * * *